United States Patent
Gabitov et al.

[19]

[11] Patent Number: 6,157,762
[45] Date of Patent: Dec. 5, 2000

[54] NONLINEAR PULSE RESHAPING FOR OPTICAL FIBER TRANSMISSION SYSTEMS

[75] Inventors: Ildar Gabitov, Balston Spar, N.Y.; Darryl D. Holm; Benjamin P. Luce, both of Los Alamos, N. Mex.; Arnold Mattheus, Munster/Altheim, Germany

[73] Assignee: The Regents of the University of California, Los Alamos, N. Mex.

[21] Appl. No.: 08/987,742

[22] Filed: Dec. 9, 1997

Related U.S. Application Data

[60] Provisional application No. 60/033,270, Dec. 9, 1996.

[51] Int. Cl.$^7$ ........................................ G02B 6/02
[52] U.S. Cl. ............................................. 385/123
[58] Field of Search ................ 385/27, 31, 122, 385/32, 141, 147, 24, 11; 359/337, 139, 333, 176; 372/6, 18, 94, 13, 106, 703, 25; 356/350, 345, 355

[56] References Cited

U.S. PATENT DOCUMENTS

| | | | |
|---|---|---|---|
| 5,479,291 | 12/1995 | Smith et al. | 359/333 |
| 5,655,039 | 8/1997 | Evans | 385/27 |
| 5,689,596 | 11/1997 | Evans | 385/27 |
| 5,717,797 | 2/1998 | Evans | 385/27 |

OTHER PUBLICATIONS

Akira Hasegawa et al., "Guilding–Center Solitons In Optical Fibers," Optics Letters 15, 1443 (1990).

N. J. Doran et al., "Nonlinear–Optical Loop Mirror," Optics Letters 13, 56 (1988).

M. E. Fermann et al., "Nonlinear Amplifying Loop Mirror," Optics Letters 15, 752 (1990).

Masayuki Matsumoto et al., "Adiabatic Amplification of Solitons by Means of Nonlinear Amplifying Loop Mirrors," Optics Letters 19, 1019 (1994).

Masayuki Matsumoto et al., "Suppression of Noise Accumulation in Bandwith–Limited Soliton Transmission by Means of Nonlinear Loop Mirrors," Optics Letters 19, 183 (1994).

Ildar Gabitov et al., "Recovery of Solitons with Nonlinear Amplifying Loop Mirrors," Optics Letters 20, 2490 (1995).

*Primary Examiner*—Akm E. Ullah
*Attorney, Agent, or Firm*—Samuel M. Freund

[57] ABSTRACT

Nonlinear pulse reshaping for optical fiber transmission systems. A procedure utilizing nonlinear amplifying loop mirrors for recovering soliton pulses nonadiabatically deformed by losses is described. Input pulses are mapped into output pulses for segments of optical fiber followed by a combination of linear and nonlinear amplification. For a wide range of amplifier spacings, it is numerically established that a single optimal input pulse of soliton shape exists for each such spacing which is well recovered at the output of the amplifier, containing only ~3% of continuous radiation.

1 Claim, 8 Drawing Sheets

NONLINEAR PULSE RESHAPING FOR OPTICAL FIBER TRANSMISSION SYSTEMS

This application claims the benefit of U.S. Provisional Application(s) No(s).: 60/033,270 Filing Date Dec. 9, 1996.

FIELD OF THE INVENTION

The present invention relates generally to processing signals traveling in fiberoptic devices and, more particularly, to the use of nonlinear amplifying loop mirrors (NALMS) for reshaping and recovering optical pulses which have undergone nonadiabatic distortions during propagation in an optical fiber due to chromatic dispersion, energy losses and other effects. This invention was made with government support under Contract No. W-7405-ENG-36 awarded by the U.S. Department of Energy to The Regents of the University of California. The government has certain rights in the invention.

BACKGROUND OF THE INVENTION

There is presently a significant industrial effort to develop and install new optical fiber transmission networks capable of extremely high data transmission capacity, and also to upgrade existing networks. In these networks, optical pulses represent binary bits of information. An obstacle to improving the capabilities of such systems is fiber chromatic dispersion which causes light having different frequencies to travel at different velocities in an optical fiber and results in optical pulses which increase their pulse width as they move within the fiber. There are additional effects, such as energy losses, other types of dispersion, and scattering interactions with the transparent glass medium which likewise degrade the received signal causing errors in the transmitted information. The problem of optical soliton transmission can be divided into two categories: (1) long-distance transmission based on dispersion-shifted fibers with periodic amplification, and (2) the improvement of existing networks based on standard monomode fibers.

One solution to the chromatic dispersion problem is the so-called Center Guiding Soliton Technique (CGST) described in "Guiding-Center Solitons In Optical Fibers," by Akira Hasegawa and Yuji Kodama, Optics Letters 15, 1443 (1990). With a proper choice of the initial amplitude and amplifier distance, the envelope of a nonlinear pulse (a guiding center soliton) propagates like a soliton over a distance much larger than the dispersion distance (the distance over which chromatic dispersion will approximately double the pulse width in the absence of other optical effects such as nonlinearity) provided it is periodically linearly amplified at distances much shorter than the dispersion distance. This technique is known to work well, but is limited by the condition that the dispersion length, $Z_d$, must be much greater than the amplifier spacing, $Z_a$. The dispersion length is proportional to the square of the pulse width. Consequently, for the short pulse widths necessary for ultrahigh data transmission rates, the dispersion length will be very short and CGST cannot be effectively applied. That is, for the improvement of existing networks based on standard monomode fibers, the dispersion length is of the same order as the amplifier spacing for the desired bit rates and, therefore, dispersion is quite significant, and the center-guiding soliton transmission is not applicable. It should be mentioned that the losses for most commonly employed optical fibers are approximately the same regardless of dispersion.

In "Nonlinear-Optical Loop Mirror," by N. J. Doran and David Wood, Optics Letters 13, 56 (1988), a nonlinear switching device for ultrafast processing based on the nonlinear propagation in a waveguide loop formed by connecting the output ports of a conventional optical coupler is proposed. The device operates on the nonlinear phase induced by self-phase modulation and does not require interferometric alignment, is robust, and is of simple construction. A single input to the optical coupler is split into two counterpropagating fields which return in coincidence to recombine at the coupler. The optical path is precisely the same for both propagating fields since they follow the same path but in opposite directions. When the coupling ratio is unity, the device simply acts as a mirror; that is, the input is reflected back upon itself when the power-coupling ratio of the coupler is unity. Otherwise (when the coupling ratio is not unity), the effect of propagation will no longer be identical since the phase modulation is intensity dependent. Only a small fraction of the available waveguide nonlinearity is used, however, since the splitting ratio must be close to 50:50 to achieve adequate modulation, and thus the differential phase delay between the two arms is low.

The output of the device proposed by Doran and Wood is nonlinearly dependent on input energy. Pulses having the correct input energy will be transmitted (switched) by the nonlinear optical loop mirror (NOLM). This applies for soliton input pulses as well as for constant beam input. Solitons are stable pulses created by a balance of the self-phase modulation and dispersion in the negative group velocity-dispersion regime in an idealized optical fiber. To leading order, in real fibers, an exact single soliton does not change shape in its propagation through the fiber rather it acquires a phase shift proportional to the distance. Even if the pulse is not an exact soliton, the effects of dispersion can be approximately balanced by the nonlinearity, and a pulse whose amplitude and shape are close to those of an exact soliton does not change significantly on propagation. When the NOLM is operated in the soliton regime, excellent switching characteristics can be obtained for bell-shaped pulses. For nonsoliton pulses, there is a requirement that the loop have sufficient length for dispersion to take effect, which in practice means a few soliton periods. Thus, the required loop length is reduced as the square of the pulse duration. For subpicosecond switching only a few meters of fiber would be required.

"Nonlinear Amplifying Loop Mirror," by M. E. Fermann et al., Optics Letters 15, 752 (1990), describes an improved exploitation of the nonlinearities of the NOLM by adding an amplifier positioned at one end of the loop in the situation where the coupler has a splitting ratio of exactly 50:50. For small optical input powers, the nonlinear amplifying loop mirror (NALM) operates in the linear regime, the mirror acting like an actual mirror and reflecting the pulses with no light emerging from the second port of the device. Since the amplifier is placed at one end of the loop at high optical input powers, the nonlinear refractive index leads to a change in the optical path lengths for light propagating in each direction, and to a phase shift therebetween. If the amplifier and the pulse lengths are short and the individual pulses do not saturate the amplifier, the pulse passing first through the amplifier experiences a G-times higher phase delay than does the pulse traveling in the other direction, where G is the gain of the amplifier. Thus, the NALM has been found to significantly improve the performance and versatility of the NOLM of Doran and Wood. In particular, the threshold power for switching is reduced and complete blockage of low-power radiation can be achieved due to the presence of a 50:50 coupler.

In "Adiabatic Amplification Of Solitons By Means Of Nonlinear Amplifying Loop Mirrors," by Masayuki Matsumoto et al., Optics Letters 19, 1019 (1994), the transmission properties of a NALM that act as an adiabatic amplifier for solitons is investigated. The authors discuss the use of NALMs in long-distance soliton transmission to suppress the accumulation of linear waves as an extension to "Suppression Of Noise Accumulation In Bandwidth-Limited Soliton Transmission By Means Of Nonlinear Loop Mirrors," by Masayuki Matsumoto et al., Optics Letters 19, 183 (1994), wherein it is numerically shown that the amplification and accumulation of noise and other dispersive waves in bandwidth-limited soliton transmission can be suppressed by using NALMs that selectively amplify solitons. The periodic insertion of NALMs in a transmission line permits soliton transmission to occur so long as the NALM acts as an adiabatic soliton amplifier and does not generate appreciable linear dispersive waves. In this paper, adiabatic amplification is applied for soliton transmission where the pulse width of the soliton is short enough such that the soliton deformation is also adiabatic (the loss distance being larger than the dispersive distance). Only the pure adiabatic case is discussed by Matsumoto et al. In other words, parameters are selected such that the initially propagated soliton essentially remains a soliton during the amplification and decay processes. A near-adiabatic soliton amplification with an amplification ratio of approximately 2 results. Thus, by a combination of adiabatic soliton amplifiers made by using NALMs with some gain-control mechanisms, filters, or saturating optical elements, long-distance transmission of solitons having picosecond durations is possible.

Accordingly, it is an object of the present invention to use nonlinear amplifying loop mirrors to recover soliton pulses nonadiabatically deformed by losses.

Another object of the invention is to use nonlinear amplifying loop mirrors at varying distances to recover soliton pulses nonadiabatically deformed by losses.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION

Briefly, the present invention uses linear and nonlinear optical devices to reshape and/or recover optical pulses which have suffered distortions during propagation in an optical fiber due to chromatic dispersion, energy losses, and other effects. The nonlinear pulse reshaping method of the invention causes the reshaping or recovery of the optical pulses into a form which has similar amplitude and phase to the pulses initially launched into the fiber. In "Recovery Of Solitons With Nonlinear Amplifying Loop Mirrors," by Ildar Gabitov et al., Optics Letters 20, 2490 (1995), which was distributed on Dec. 09, 1995 to the general public, the teachings of which are hereby incorporated by reference herein, a theoretical analysis of the use of NALMs to recover pulses is described. When soliton input pulses having the form $\eta\mathrm{sech}(\eta T)$ are propagated by lossy optical fibers, they can be mapped into substantially similar waveforms by using a NALM plus some linear amplification for a wide range of amplifier spacings and fiber losses.

It is well known that the evolution of pulses in monomode optical fibers can be described in standardized nondimensional "soliton" units by the damped nonlinear Schrödinger equation $$\frac{\partial E}{\partial \xi} = \frac{i}{2}\frac{\partial^2 E}{\partial \tau^2} + i|E|^2 E - \Gamma E, \quad (1)$$

where E is the complex envelope of the electric field, $\xi$ is the fiber coordinate, $\Gamma$ is the loss parameter, and $\tau$ is the retarded time. Solutions having the initial condition $E_0 = \beta$ sech $(\beta\tau)$ for arbitrary values of $\beta$, $\Gamma$, and amplifier spacings $\xi_a$ are considered. Generally, $\Gamma$ and $\xi_a$ are dictated by particular applications. By defining $Z \equiv \xi/\xi_a$, $T \equiv \tau/\sqrt{\xi_a}$, $q \equiv E\sqrt{\xi_a}$, and $\gamma \equiv \xi_a \Gamma$, Eq. (1) may be rescaled to $$\frac{\partial q}{\partial Z} = \frac{i}{2}\frac{\partial^2 q}{\partial T^2} + i|q|^2 q - \gamma q. \quad (2)$$

Figure 1:
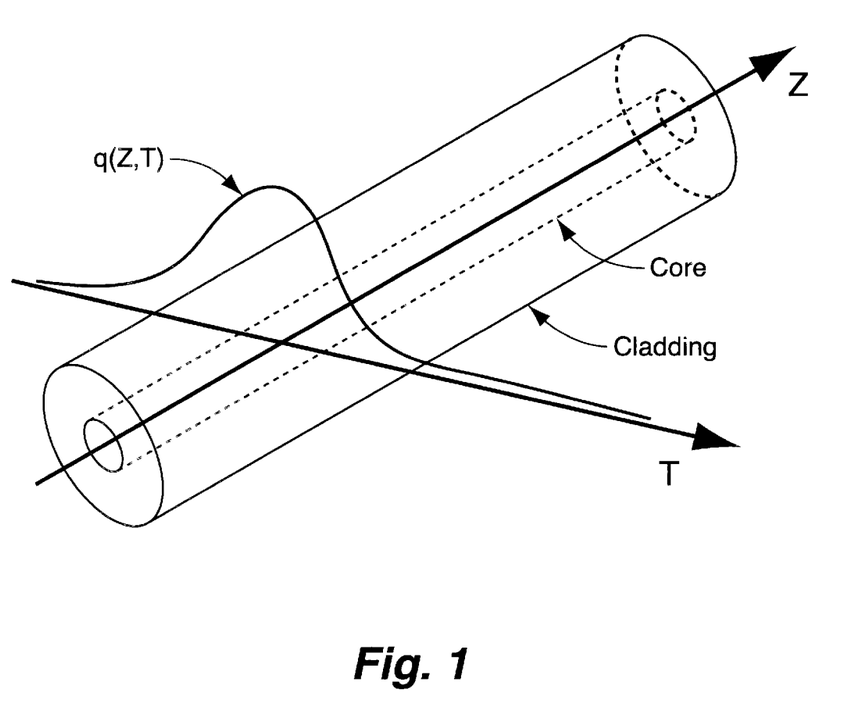
FIG. 1 is a schematic representation of the propagation of a pulse in an optical fiber.
Figure 2:
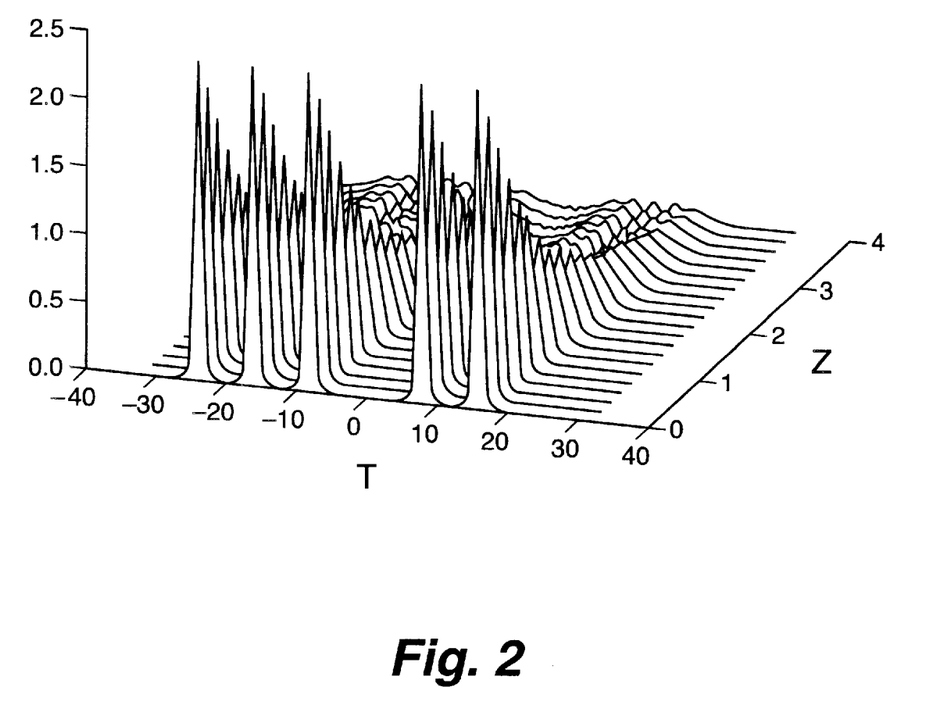
FIG. 2 is a numerical simulation of the decrease in amplitude and broadening of initially soliton solutions to the damped, focusing nonlinear Schrödinger equation.

Equation (2) is a rescaled representation having unit propagation distance which again describes the electrical field envelope of pulses in a single-mode optical fiber (with anomalous dispersion) to leading order in nondimensional units. The parameters Z and T are illustrated in FIG. 1. At $\gamma = 0$, this damped, focusing, nonlinear Schrödinger equation supports the solutions, $$q(Z, T) = \eta \cdot \mathrm{sech}(\eta \cdot [T - \kappa Z + \Omega_0])e^{i\kappa T + \frac{i}{2}(\eta^2 - \kappa^2)Z + i\sigma_0},$$

where $\eta$, $\kappa$, $\Omega_0$ and $\sigma_0$ are the (real) "soliton parameters." These are the only stable pulse solutions of Eq. (2) (with $\gamma = 0$) and are therefore ideal candidates for binary bit carriers. Losses, however, cause significant pulse decay over propagation distances of the order of 35 kilometers. For $\gamma > 0$, if the pulses initially have soliton shape and have sufficiently large amplitude, adjacent pulses will broaden and merge together over such distances. A numerical simulation of the combined effect is illustrated in FIG. 2.

Having scaled the amplifier spacing to unity in Eq. (2), the evolution of the soliton wave from the initial condition $q_0 = \eta \operatorname{sech}(\eta, T)$, where $\eta = \beta \sqrt{\xi_a}$, as described by Eq. (2), is completely determined by the dimensionless parameter $R \equiv \eta^2/\gamma$, where $\eta$ is both the initial pulse width of the soliton and its initial amplitude and is proportional to the bit rate, and $\gamma$ = effective loss rate, which is proportional to the amplifier spacing. Thus, R is the ratio of dispersion and nonlinearity to damping. For R<0.1, the bit rate is low and the broadening is small. The "center guiding soliton" procedure is applicable here. For R sufficiently large, say for R>>50, the bit rate is high, but the soliton decays adiabatically. That is, $$q \approx \eta \cdot e^{-2\gamma Z} \operatorname{sech}(\eta \cdot e^{-2\gamma Z} T)$$

and there is significant broadening of the pulse. To obtain higher bit rates than those achievable with linear amplifiers commonly used, it is desirable to operate in an intermediate regime, where 0.1<R<50. Pulse reshaping is then required. According to the method of the present invention, nonlinear devices are inserted at each amplifier position to reshape the pulses. If one defines a fixed point to be an input pulse which emerges virtually the same after first propagating through a fiber and subsequently being processed using the nonlinear device, one may survey the possible nonlinear devices and input pulses for the desired result, which is a fixed point.

The dispersive components of the output pulse from the device should be minimized in order to minimize pulse interactions. In practice, if one has knowledge of the temporal profile q(T) of a pulse, dispersive percentages are measured by first numerically calculating the bound-state eigenvalues $\xi$ of the linearized eigenvalue problem:

$$\begin{pmatrix} \frac{\partial}{\partial T} & -q \\ -q^* & -\frac{\partial}{\partial T} \end{pmatrix} \begin{pmatrix} \Psi_1 \\ \Psi_2 \end{pmatrix} = -i\xi \begin{pmatrix} \Psi_1 \\ \Psi_2 \end{pmatrix}.$$

In terms of the bound-state eigenvalues $\xi$, the percentage of dispersive energy in the pulse q is given by $$\Delta E = \frac{E - 4\sum_n \operatorname{Im}[\xi_n]}{E} (100\%),$$

where E is the pulse energy. There are similar formulas for the dispersive percentages with respect to other conserved quantities of the nonlinear Schrödinger equation, such as the Hamiltonian. The properties of the NALM of Fermann et al., supra, shown in FIG. 3, hereof, were investigated by the present inventors for applicability as the nonlinear device. The NALM utilizes the different Kerr nonlinearity for each counter-propagating pulse (G>1) to produce an intensity dependent phase difference and, hence, an intensity dependent output. If G=1, the input pulse is entirely reflected by the device. Matsumoto et al. (1994), supra, point out that if $$\eta^2 LG(G \pm 1)/4 \ll 1, \text{ then } q_{out} \approx iA|q_{in}|^2 q_{in},$$

Figure 3:
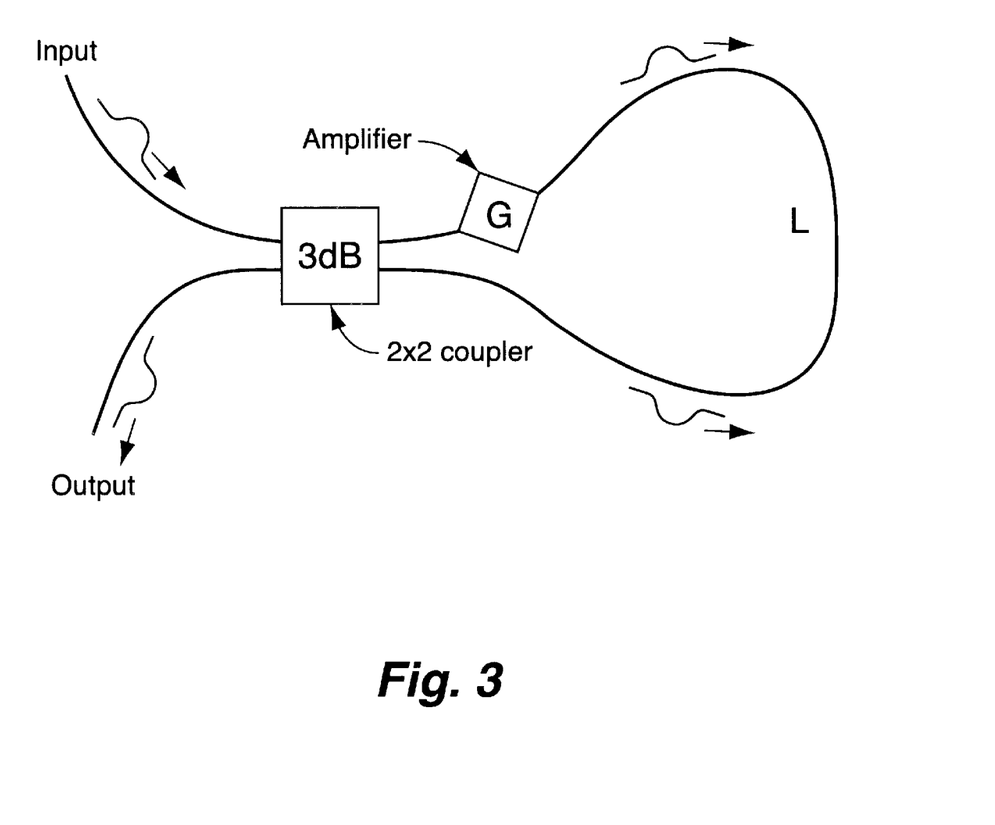
FIG. 3 is a schematic representation of the nonlinear amplifying loop mirror of Fermann et al., supra.

-continued $$\text{where } A = \frac{L\sqrt{G}}{4}(G - 1).$$

This cubing effect narrows the input pulse in a chirp-free manner. It was found by the present inventors that for each amplifier spacing chosen to be in a particular continuous range of spacings depending on the type of optical fiber, there was one optimal pulse with a corresponding optimal value for A, for which the output pulse, after propagation through the optical fiber and passing through the NALM, was very nearly the same as the input pulse; that is, a fixed point was found by the inventors of the present invention.

Figure 4:
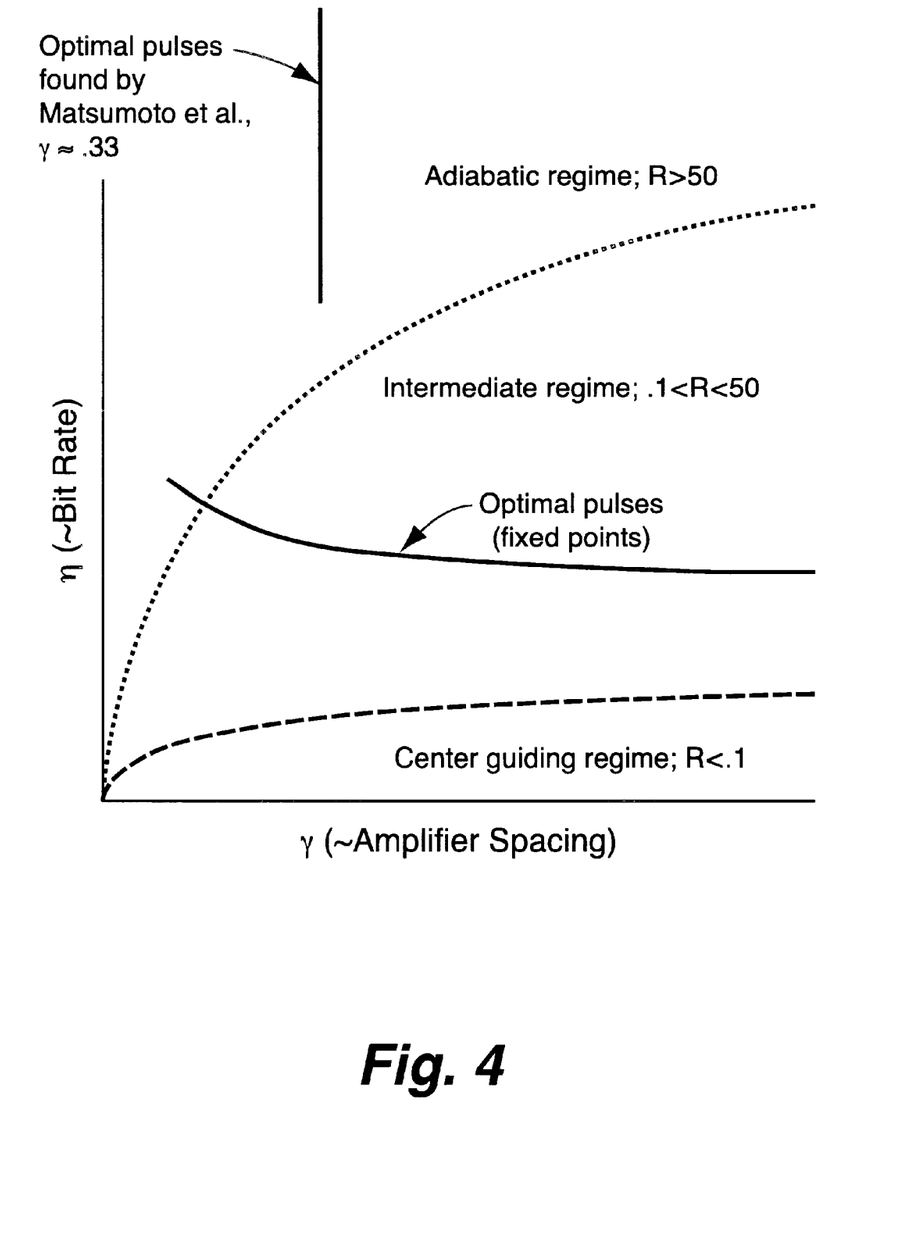
FIG. 4 illustrates the location in universal, dimensionless parameter space of the optimal pulses of the present invention.

FIG. 4 schematically illustrates the location of the optimal pulses with respect to the various possible operating regimes. In particular, the location of a set of optimal pulses discovered by Matsumoto et al. (1994), supra, is identified as being well separated from the optimal pulses in the parameter regime of the present invention. The pulses discovered by Matsumoto et al. (1994) apply for a given type of fiber, only for a particular amplifier spacing, and only in the adiabatic regime. By contrast, FIG. 4 shows that the results of the present invention apply over a significant range of different amplifier spacings and lie in the nonadiabatic regime.

The present invention is now more precisely described. First, the relationships deriving from Eq. (2) with its initial condition $q_0 = \eta \operatorname{sech}(\eta T)$ are described. With amplifier spacing $z_a$ in kilometers and fiber losses $L_{dB}$ in decibels per kilometer, $$\gamma = \frac{z_a L_{dB} \log 10}{20[dB]}.$$

The pulse width $t_s$ (full-width at one-half maximum of the intensity of initial pulses corresponding to $q_0$ in picoseconds is $1.76\sqrt{z_a k''}/\eta$, where k" is the group-velocity dispersion in picoseconds squared per kilometer. For a fixed fiber type and carrier frequency, there is a one-to-one correspondence between $\gamma$ and $z_a$, and also between $\eta$ and $t_s$ for fixed $Z_a$.

As mentioned hereinabove, if the nondimensional NALM loop length L, the loop amplifier gain G, and the input amplitude $\eta$ are such that $\eta^2 L(G \pm 1)/4 \ll 1$, as pointed out in Matsumoto et al. (1994), supra, then the NALM approximately cubes the amplitudes of the pulses passing therethrough, so that $$q_{out} \approx iA|q_{in}|^2 q_{in}, \quad (3)$$

where $$A = \sqrt{G_3} \frac{L\sqrt{G}}{4}(G - 1). \quad (4)$$

Here $G_3$ represents the gain of an optional additional amplifier following the NALM, which might sometimes be desirable for producing particular values of A while maintaining the cubing effect. Optimal pulses and NALM configurations may be found by fixing $\gamma$ and numerically simulating pulse propagation and amplification by the NALM for different values of $\eta$.

More generally, the present invention includes the use of NALMs along with any required components for achieving the desired cubing effect of Eq. (3) (including the optimal values of A, a potentially complex constant) in an economical and reliable manner. For example, the NALM may be configured to include an additional linear amplifier either before or after this nonlinear device or at both locations. If an amplifier with gain $G_1$ is inserted before the NALM and an amplifier with gain $G_3$ is inserted after the NALM, the expression for A becomes $$A = G_1^{3/2}\sqrt{G_3}\frac{L\sqrt{G}}{4}(G-1),$$

where G is defined hereinabove. For recovery of the optimal pulses, the value of A must still be one of the optimal values set forth hereinbelow. Therefore, the addition of amplifiers outside of the NALMs does not constitute a fundamental change in the present invention. Moreover, the use of polarizers, polarization-maintaining fibers, etc. may also be required to insure that the NALMs achieve the cubing effect of Eq. (3) in a particular situation, and the addition of filters may be required to overcome extraneous noise due to the amplifiers. Additional couplers may also be used, for example, to output signals along a transmission line.

The optimal pulses are found by trying various values of $\eta$ under the constraint that the parameter A is chosen for each trial value of $\eta$ such that the output pulse also has peak amplitude $\eta$. Following Matsumoto et al. (1994), supra, an optimal pulse is defined as one that produces the least percentage of dispersive wave energy and the least-dispersive components in the nonlinear Schrödinger Hamiltonian in the output pulse. These percentages are labeled $\Delta E$ and $\Delta H$, respectively. Expressions for these quantities appear in Matsumoto et al. (1994), supra (The expression for $\Delta E$ appears hereinabove).

Figure 5:
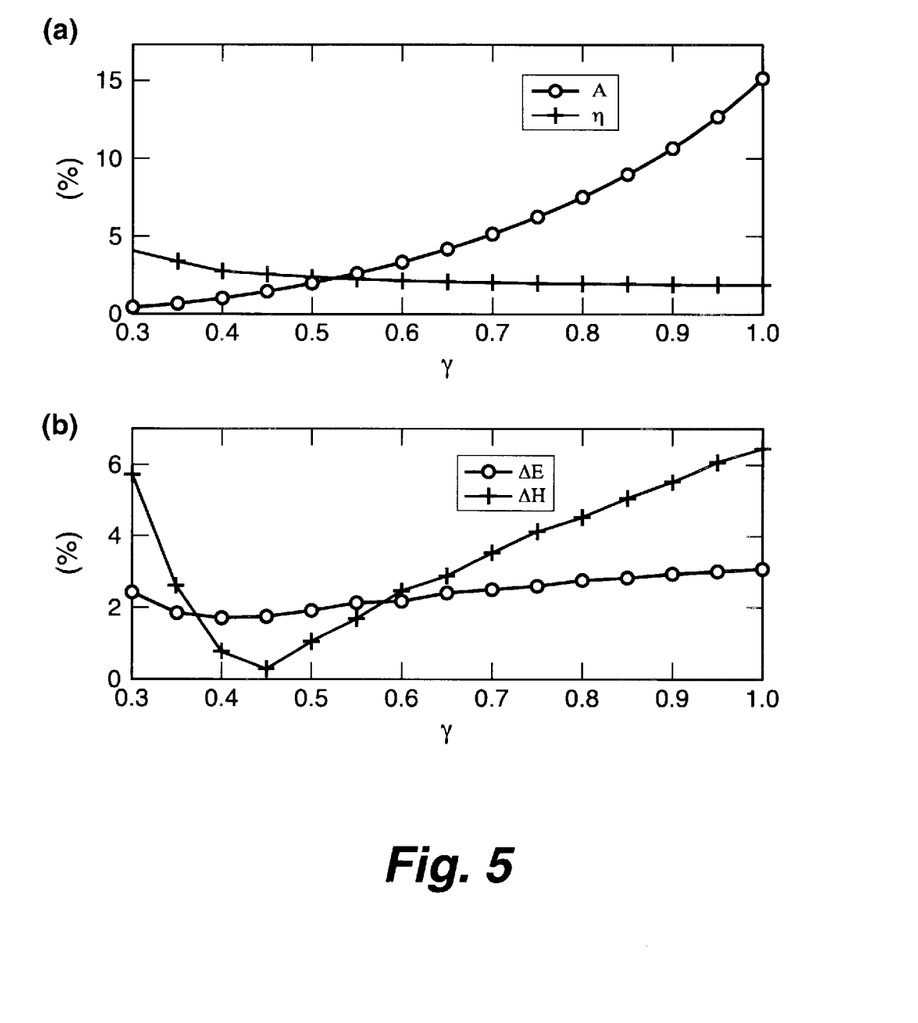
FIGS. 5a and 5b are graphs of the optimal parameters $\eta$ and A as a function of $\gamma$ and of the dispersive percentages of the wave energy and the nonlinear Schrödinger Hamiltonian in the, output pulses versus $\gamma$, respectively.

For each choice of $\gamma$ in the interval [0.3,1], Gabitov et al., supra, find that there is a unique optimal pulse with a minimum dispersive energy output of about 2–3%, with a minimum of dispersive components of the Hamiltonian between 0.3% and ~6%. Outside of this range in $\gamma$, or for choices of $\eta$ smaller or larger than optimal, the integrity of the output pulse is significantly degraded. Optimal values of A and $\eta$ are given in TABLE 1 and in FIG. 5(a). The percentages $\Delta E$ and $\Delta H$ are given in FIG. 5(b). The optimal values of $\eta$ do not strongly depend on $\gamma$ and therefore are not strongly dependent on the amplifier spacing, which is an important consideration for cascaded systems.

TABLE 1

| $\gamma$ | A | $\eta$ |
|---|---|---|
| 0.3 | 0.4 | 3.97 |
| 0.4 | 1.2 | 2.73 |
| 0.5 | 2.1 | 2.37 |
| 0.6 | 3.3 | 2.19 |
| 0.7 | 5.0 | 2.05 |
| 0.8 | 7.4 | 1.95 |
| 0.9 | 10.7 | 1.88 |
| 1.0 | 15.3 | 1.83 |

From TABLE 1 it is found that the quantity $R \equiv \eta^2/\gamma$ takes values for the optimal pulses in the range $R\epsilon[3,50]$. This is well outside the adiabatic range. Therefore, the optimal pulses do not decay adiabatically during the propagation stage and are not an example of the adiabatic amplification of solitons reported by Matsumoto et al. (1994), supra. Adiabatic decay occurs only at values of $\eta$ significantly higher than the identified optimal values of the present invention and, furthermore, it can easily be shown that the adiabatic approach can solve the full mapping problem only for $\gamma \approx 0.33$. For a given optical fiber and carrier frequency, this uniquely defines the NALM spacing. The fact that the optimal values for $\eta$ fall below the adiabatic regime has advantages because the optimal intensities are not so high as to invalidate the assumption that the damped nonlinear Schrödinger equation applies.

Because of the NALM cubing effect, the optimal pulses are intrinsically unstable under repeated recoveries by the NALM unless the absolute and relative amplitudes of the pulses are stabilized or unless no more than five NALMS are employed. If the propagation stage was perfectly linear, it follows that by linearizing Eq. (3) small amplitude perturbations would grow by exactly a factor of 3 uniformly in time at each NALM stage. In reality, the propagation stage operates on perturbations in a temporally nonlocal manner that is difficult to characterize concisely for all perturbations. For the situation where the perturbations are parametric, that is, where the initial pulses have the form $q_0=(\eta+\delta\eta)\text{sech}(\eta+\delta\beta)T$, an estimate for the mapping of $\delta\eta$ and $\delta\beta$ from NALM to NALM is $$\begin{bmatrix}\delta\eta_{n+1}\\\delta\beta_{n+1}\end{bmatrix}=\begin{bmatrix}6 & -3\\2 & -1\end{bmatrix}\begin{bmatrix}\delta\eta_n\\\delta\beta_n\end{bmatrix}. \quad (5)$$

This map can be inferred because, in the undamped nonlinear Schrödinger equation, an initial condition of the form $q_0=(\eta+\delta\eta)\text{sech}(\eta+\delta\beta)T$ produces a soliton having an amplitude $(\eta 2\delta\eta-\delta\beta)\text{sech}(\eta 2\delta\eta-\delta\beta)T$. Therefore, $(\delta\eta,\delta\beta)$ goes approximately to $(2\delta\eta-\delta\beta, 2\delta\eta-\delta\beta)$. Linearizing the cubing effect then contributes a factor of 3 to the first factor, yielding Eq. (5). The eigenvalues of the matrix of the right-hand side of Eq. (5) are 5 and 0, with the eigenvector associated with the value 5 being located along the line $\delta\eta=\delta\eta/3$ the actual eigenvalues for $0.3 \leq \gamma \leq 1$ were numerically found to lie within the ranges 3.5 to 5 and −0.35 to −0.20, respectively). Simulation shows that these eigenvalues imply that the perturbation will decrease initially at each NALM if $(2\delta\eta_n-\delta\beta_n)$ is sufficiently small, but thereafter will grow roughly along the line $\delta\beta=\delta\eta/3$ by a factor of 5 at each NALM. Therefore, propagation effects can initially diminish, but ultimately aggravate the instability. The mapping of Eq. (5) also predicts a tendency in each iteration of the map for pulses just below optimum amplitude to broaden in pulse width as they decay, whereas pulses just above become narrower as they diverge from the optimal pulse shape in each iteration of the map.

Figure 6:
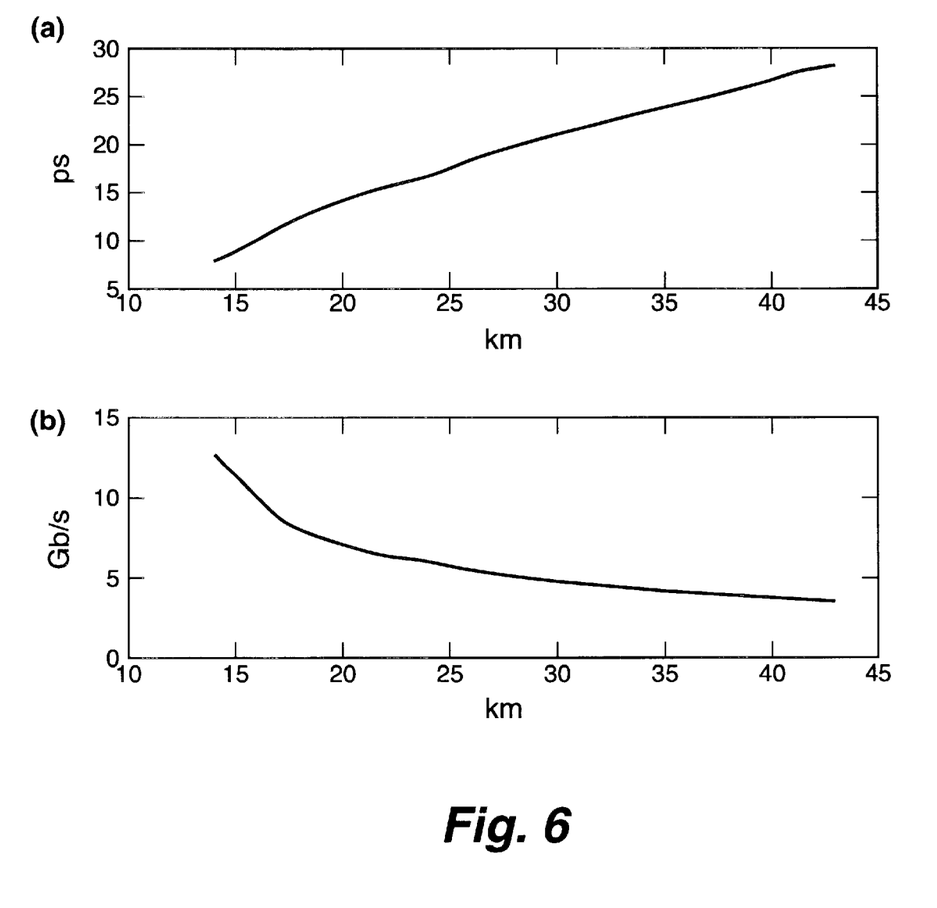
FIGS. 6a and 6b are graphs of the optimal pulse widths and the optimal bit rates as a function of amplifier spacing, respectively.
Figure 7:
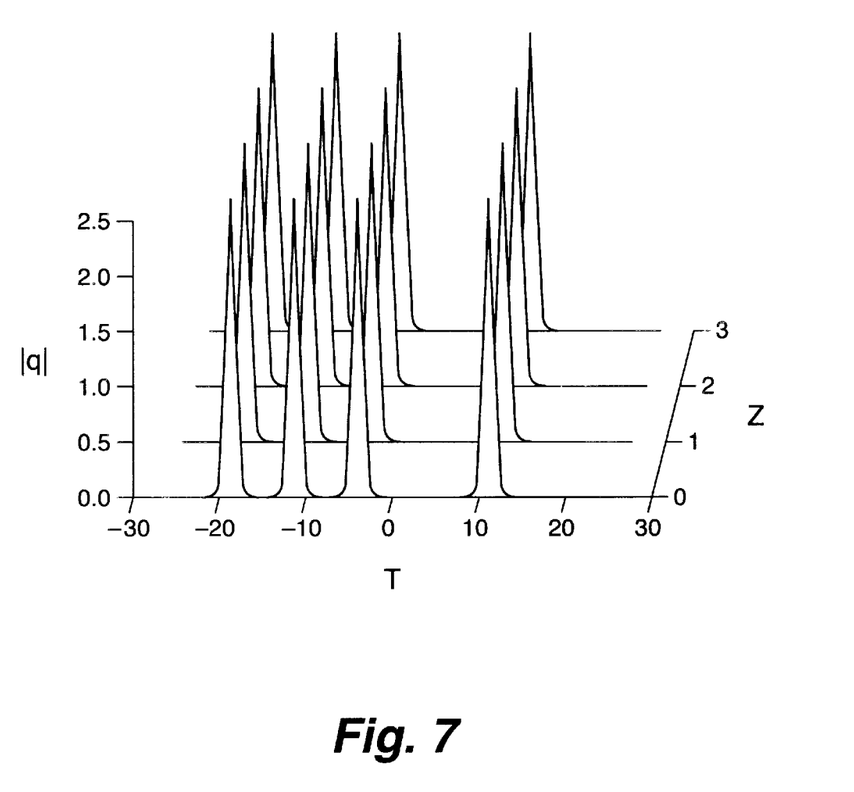
FIG. 7 shows an optimal bit stream undergoing several successful recoveries according to the teachings of the present invention.

In numerical simulations, indefinitely stable recovery of single pulses can be achieved by a slight adjustment of the parameter A at each NALM to maintain the peak output amplitude equal to the optimal $\eta$. This suggests that residual continuous radiation does not aggravate the instability for single pulses. Numerical simulations of bit streams with interacting pulses (5 to 10 pulse widths apart) suggest that distances of 50 to 200 km for standard monomode fibers with low error rates might be achievable without additional stabilization measures. Pulse width and bit rate versus amplifier spacing for standard monomode fibers at 1.55 $\mu$m for the optimal pulses with 10-pulse-width spacing are shown in FIGS. 6a and 6b. FIG. 7 shows snapshots from a numerical simulation of a bit stream of optimal pulses at $\gamma=0.5$ undergoing several successful recoveries without any stabilization measures (the pulses are shown after each NALM).

According to the teachings of the present invention, for an actual problem, the following steps are undertaken:

1. A fiber and a pulse wavelength are chosen. This fixes the following parameters:

a. $\lambda$, the wavelength in $\mu$m;
b. $n_2$, the nonlinear coefficient in cm²/watt (typically, $3.2 \times 10^{-16}$ cm²/W);
c. D, the dispersion coefficient in ps/(nm.km);
d. $L_{dB}$, the power loss coefficient in dB/km; and
e. $A_{\text{eff}}$, the so-called effective area of the fiber in square $\mu$m;

2. Choose an amplifier spacing $z_a$ in km (typically between 10 and 40 km);
3. Calculate the effective loss parameter $\gamma$:

$$\gamma = \frac{z_a L_{dB}}{20} \frac{\ln(10)}{[dB]}.$$

If $\gamma$ is greater than unity, a smaller amplifier spacing must be chosen;

4. Use the data in the TABLE, hereinabove to locate the corresponding optimal values of $\eta_{opt}$ and $A_{opt}$ following the procedure of Gabitov et al., supra, in the nonadiabatic range [0.1,50] for the parameter $R = \eta^2/\gamma$;

5. In physical units, the peak power of the optimal pulse is then given by:

$$P_{peak} = \eta_{opt}^2 \frac{\lambda A_{\text{eff}}}{2\pi n_2 z_a},$$

and the pulse width (full-width-at-half-maximum of the intensity) is given by:

$$t_S = \frac{1.76}{\eta_{opt}} \sqrt{\frac{z_a \lambda^2}{2\pi c}};$$

6. The physical length of the loop mirrors depends on $A_{opt}$, the choices of the gain of the amplifiers in the loop and additional amplifiers, and the value of $n_2$ for the fiber from which the loop mirror is constructed. Given the amplifier gains and $A_{opt}$, the nondimensional loop length, L, is determined implicitly (uniquely) by:

$$A_{opt} = G_1^{3/2} \sqrt{G_3} \frac{L\sqrt{G}}{4}(G-1).$$

The loop length, $z_L$, in physical units is then given by $$z_L = L z_a \frac{n}{n_2^{loop}} \frac{n_2}{n_2^{loop}},$$

where $n_2^{loop}$ is the nonlinearity coefficient for the fiber used in the loop.

As a numerical example where optimal NALM parameters for standard monomode fibers are set forth, a choice for the amplifier spacing of 21.3 km yields $\gamma=0.5$, which has associated optimal values A=2.1 and $\eta=2.37$. NALM parameters that produce this value of A, while preserving the cubing approximation to high accuracy, are $G=G_3=236$ (23.7 dB) with a loop length of 3.3 m.

Having generally described the invention, the following EXAMPLE demonstrates its use.

EXAMPLE

Figure 8:
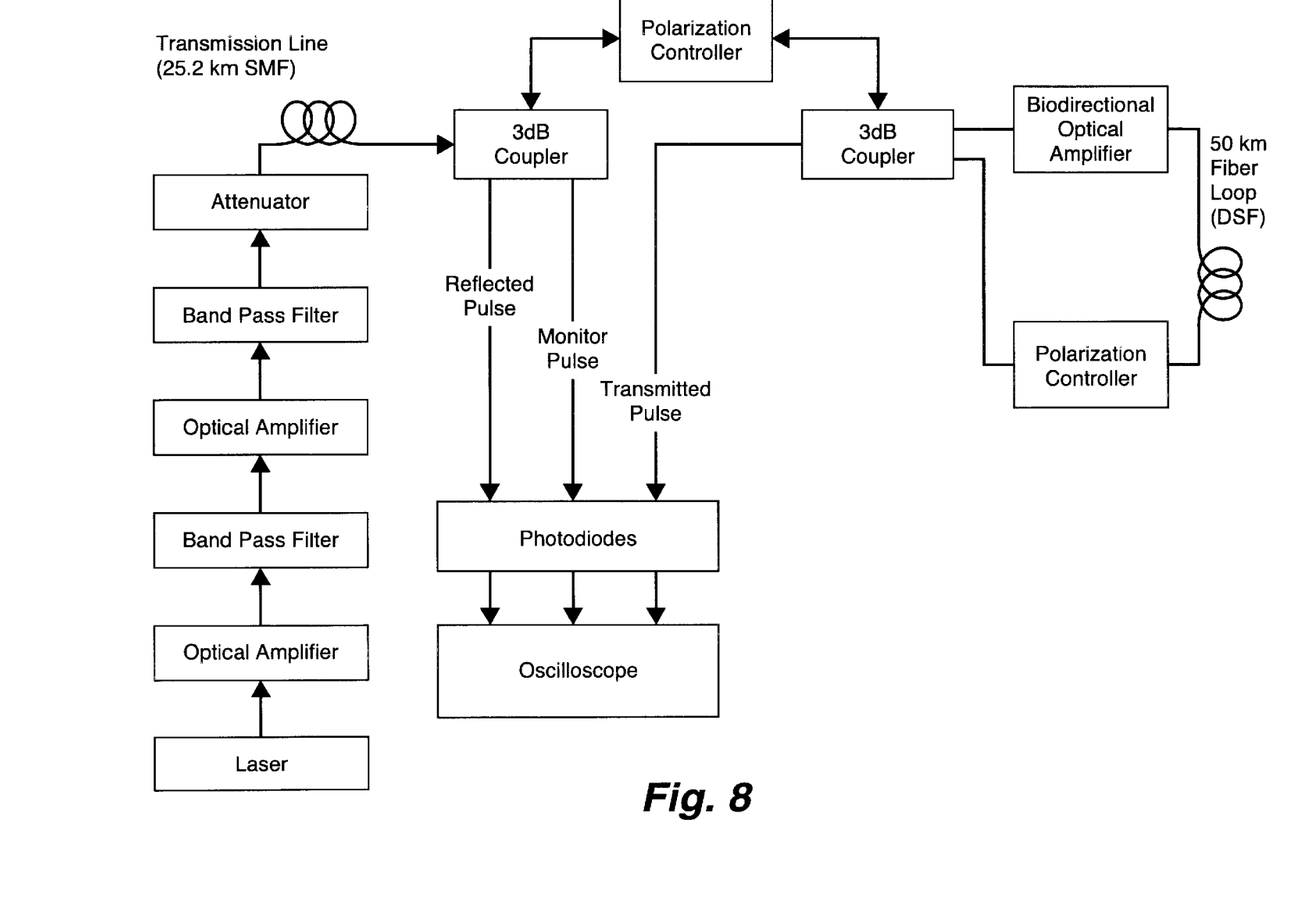
FIG. 8 is a schematic representation of the apparatus used to demonstrate the method of the present invention.

An experiment was carried out to verify that pulses which have been broadened in pulse width due to transmission through a long length of optical fiber can be restored to their initial pulse width by a NALM according to the teachings of the present invention. To verify this, 41 picosecond soliton-shaped pulses were introduced into a 25.2 km segment of standard monomode fiber (SMF) followed by an extra 3 dB coupler followed by a NALM. The soliton-shaped pulses were generated using a pulsed laser which produces 41 picosecond pulses with a 12 GHz bandwidth at a repitition rate of 2 GHz. These pulses were then formed into soliton shape using two optical amplifiers, two bandpass filters, and an attenuator. Polarization controllers were inserted in front of and within the loop of the NALM. A schematic representation of the apparatus employed is shown in FIG. 8.

The extra 3 dB coupler was inserted in front of the NALM so that the pulses at the end of the SMF segment before entering the NALM could be measured, thereby verifying that the pulses did broaden in the SMF segment due to dispersion. These pre-NALM pulses may be termed "monitor pulses". The insertion of this coupler also allowed for the pulses reflected by the NALM to be measured, providing a second verification of the pulse compression properties of the NALM. Mathematically, the reflected pulse should be broader in pulsewidth than the monitor pulse, and the transmitted (output) pulse should be narrower than the monitor pulse, if the NALM is properly compressing pulses. The receivers of the optical signals in the time domain included fast photo-diodes, the output of which was measured by an oscilloscope.

The amplifier in the NALM must be bidirectional because it has to amplify signals propagating both clockwise and counterclockwise directions in the loop. An erbium-doped fiber amplifier having no isolators was employed. Because there were no pulse measurements taken directly in the loop (this is difficult to accomplish without disturbing the functioning of the NALM), the gain of the amplifier in the NALM loop was difficult to determine with certainty, although it was possible to increase or decrease the gain with certainty. Therefore, a series of pulses with unknown but increasing gain were measured. The pulse widths of the monitor, transmitted, and reflected signals for these trials were measured and are presented in TABLE 2.

TABLE 2

| Trial | Monitor (ps) | Transmitted (ps) | Reflected (ps) |
|---|---|---|---|
| I | 42.2 | 24.4 | 71.4 |
| II | 50.2 | 23.6 | 67.6 |
| III | 49.8 | 27.8 | 63.2 |
| IV | 51.4 | 32.2 | 61.8 |
| V | 53.8 | 29.6 | 62.2 |
| VI | 51.4 | 29.0 | 55.2 |
| VII | 51.2 | 35.6 | 60.0 |
| VIII | 51.4 | 41.6 | 54.4 |
| IX | 51.5 | 50.4 | 43.8 |
| X | 53.6 | 50.2 | 41.8 |

In this data, the gain increases monotonically with Trial number although the exact values were not known and are not provided. This data confirms the ability of the NALM to compensate for dispersive broadening. In all of the trials, the pulse width of the monitor pulses are seen to be well above 41 ps, confirming that the input pulses were broadened by propagation through the SMF segment. In Trials I through VII, the pulse widths of the transmitted pulses were below 41 ps, demonstrating that the NALM can more than compensate for this broadening. Finally, it may be observed that in Trials VI through IX, the pulse width of the transmitted pulses increases monotonically with Trial number (and therefore with the gain of the amplifier in the NALM loop). In trial VIII, the pulse width of the transmitted pulse is close to 41 ps. These two facts together imply that there is a particular amplifier gain which produces transmitted pulses of exactly 41 ps, showing that the input pulse width to the SMF segment can be restored. The existence of a unique value of the gain for a given pulse width is also consistent with the theoretical predictions.

The foregoing description of the invention has been presented for purposes of illustration and description and is not intended to be exhaustive or to limit the invention to the precise form disclosed, and obviously many modifications and variations are possible in light of the above teaching.

The embodiment was chosen and described in order to best explain the principles of the invention and its practical application to thereby enable others skilled in the art to best utilize the invention in various embodiments and with various modifications as are suited to the particular use contemplated.

What is claimed is:

1. A method for recovering the initial shape of soliton-shaped optical pulses having a chosen wavelength which have undergone nonadiabatic distortions as a result of propagation through a length, $z_a$, of optical fiber, which comprises the steps of:

(a) selecting the length, $z_a$, of optical fiber to be the distance said soliton-shaped optical pulses must travel before reaching a nonlinear amplifying loop mirror such that the loss parameter, $\gamma$, where $$\gamma = \frac{z_a L_{dB}}{20} \frac{\ln(10)}{[dB]},$$

is less than unity, where $L_{dB}$ is the power loss coefficient, thereby determining the values of the parameters $A_{opt}$ and $\eta_{opt}$;

(b) generating soliton-shaped pulses having a peak power, $P_{peak}$, where $$P_{peak} = \eta_{opt}^2 \frac{\lambda A_{eff}}{2\pi n_2 z_a},$$

where $n_2$ is the nonlinear Kerr coefficient and $A_{eff}$ is the effective area of the fiber, and having a pulse width, $t_s$, where $$t_s = \frac{1.76}{\eta_{opt}} \sqrt{\frac{z_a \lambda^2 D}{2\pi c}};$$

(c) directing said soliton-shaped pulses into said optical fiber; and (d) selecting the gain of the nonlinear amplifying loop mirror such that the peak power of said soliton-shaped pulses passing through said nonlinear amplifying loop mirror is cubed, with the result that the peak power and pulse width of said soliton-shaped pulses are restored to the originally generated values thereof.

* * * * *